US009845246B2

(12) United States Patent
Schmelzer et al.

(10) Patent No.: US 9,845,246 B2
(45) Date of Patent: Dec. 19, 2017

(54) PROCESS FOR RECOVERING CARBON MONOXIDE FROM CATALYTIC FAST PYROLYSIS PRODUCT

(71) Applicant: Anellotech, Inc., Pearl River, NY (US)

(72) Inventors: Eugene Schmelzer, Baltimore, MD (US); Charles Sorensen, Haverstraw, NY (US); Michael Tanzio, Cherry Hill, NJ (US)

(73) Assignee: ANELLOTECH, INC., Pearl River, NY (US)

( * ) Notice: Subject to any disclaimer, the term of this patent is extended or adjusted under 35 U.S.C. 154(b) by 295 days.

(21) Appl. No.: 14/919,881

(22) Filed: Oct. 22, 2015

(65) Prior Publication Data

US 2016/0122190 A1 May 5, 2016

Related U.S. Application Data

(60) Provisional application No. 62/074,388, filed on Nov. 3, 2014.

(51) Int. Cl.
*B01D 53/14* (2006.01)
*C01B 31/18* (2006.01)

(52) U.S. Cl.
CPC .......... *C01B 31/18* (2013.01); *B01D 53/1475* (2013.01); *B01D 2252/205* (2013.01); *B01D 2252/2026* (2013.01); *B01D 2252/2028* (2013.01); *Y02C 10/06* (2013.01)

(58) Field of Classification Search
None
See application file for complete search history.

(56) References Cited

U.S. PATENT DOCUMENTS

| | | |
|---|---|---|
| 4,671,893 A | 6/1987 | Pinto |
| 4,726,816 A | 2/1988 | Fuderer |
| 4,836,833 A | 6/1989 | Nicholas et al. |
| 4,861,351 A | 8/1989 | Nicholas et al. |
| 5,073,356 A | 12/1991 | Guro et al. |
| 6,342,091 B1 | 1/2002 | Menzel et al. |
| 7,982,077 B2 | 7/2011 | Kalnes et al. |
| 8,277,643 B2 | 10/2012 | Huber et al. |
| 8,535,613 B2 | 9/2013 | Ogino et al. |
| 2009/0077868 A1 | 3/2009 | Brady et al. |
| 2009/0133437 A1 | 5/2009 | Reyneke et al. |

(Continued)

OTHER PUBLICATIONS

International Search Report and Written Opinion issued in a corresponding application PCTUS2015/056834 dated Jan. 19, 2016.

*Primary Examiner* — Anita Nassiri Motlagh
(74) *Attorney, Agent, or Firm* — Roberts Mlotkowski Safran Cole & Calderon P.C.

(57) ABSTRACT

The present invention provides an improved process for recovering CO from a catalytic fast pyrolysis (CFP) process product effluent. The process comprises the steps of: a) providing a first vapor phase stream resulting from a CFP process comprising, on a water-free and solids-free basis, from 25 to 80% CO and at least 15% $CO_2$, b) mixing the first vapor phase stream of step a) with a particular solvent to make a mixed phase stream, c) separating the mixed phase stream of step b) into a second vapor phase stream comprising CO and a liquid phase stream, and d) recovering a product stream from the second vapor phase stream of step c) having a higher concentration of CO and a lower concentration of $CO_2$ than the first vapor phase stream of step a).

16 Claims, 4 Drawing Sheets

(56) References Cited

U.S. PATENT DOCUMENTS

| | | |
|---|---|---|
| 2013/0060070 A1 | 3/2013 | Huber et al. |
| 2013/0324772 A1 | 12/2013 | Huber et al. |
| 2014/0027265 A1 | 1/2014 | Mazanec et al. |
| 2014/0107306 A1 | 4/2014 | Mazanec et al. |

PROCESS FOR RECOVERING CARBON MONOXIDE FROM CATALYTIC FAST PYROLYSIS PRODUCT

FIELD OF THE INVENTION

The present invention relates to an improved process for recovering carbon monoxide from a catalytic fast pyrolysis process product effluent.

BACKGROUND OF THE INVENTION

The needs for travel and consumer goods have driven the ever increasing consumption of fossil fuels such as coal and oil, typically obtained from deep underground. The extraction of fossil fuels by mining and drilling has often been accompanied by environmental and political costs. Furthermore, as the more accessible sources of fossil fuels are being used up; this has led to the pursuit of more expensive extraction technologies such as fracking and deep sea drilling. Additionally, the consumption of fossil fuels causes higher levels of atmospheric carbon, typically in the form of carbon dioxide.

To reduce these problems, there have been extensive efforts made in converting biomass to fuels and other useful chemicals. Unlike fossil fuels, biomass is renewable and carbon-neutral; that is, biomass-derived fuels and chemicals do not lead to increased atmospheric carbon since the growth of biomass consumes atmospheric carbon.

Much of the work on biomass has involved converting refined biomass including vegetable oils, starches, and sugars; however, since these types of refined biomass may alternatively be consumed as food, there is even a greater utility for converting non-food biomass such as agricultural waste (bagasse, straw, corn stover, corn husks, etc.), energy crops (like switch grass and saw grass), trees and forestry waste, such as wood chips and saw dust, waste from paper mills, plastic waste, recycled plastics or algae, in combination sometimes referred to as cellulosic biomass. Biomass generally includes three main components: lignin, hemicellulose, and cellulose.

Generating fuels and chemicals from biomass requires specialized conversion processes different from conventional petroleum-based conversion processes due to the nature of the feedstock. High temperatures, solid feed, high concentrations of water, unusual separations, and oxygenated by-products are some of the features of biomass conversion that are distinct from those encountered in petroleum upgrading. Thus, despite extensive efforts, there are many challenges that must be overcome to efficiently produce chemicals or fuels from biomass.

A variety of biomass-derived polymeric materials such as lignin, cellulose, and hemicellulose, can be pyrolyzed to produce mixtures of aromatics, olefins, carbon monoxide (CO), carbon dioxide ($CO_2$), water, and other products. A particularly desirable form of pyrolysis is known as catalytic fast pyrolysis (CFP) that involves the conversion of biomass in a catalytic fluid bed reactor to produce a mixture of aromatics, olefins, and a variety of other materials. The aromatics include benzene, toluene, xylenes (collectively BTX), and naphthalene, among other aromatics. The olefins include ethylene, propylene, and lesser amounts of higher molecular weight olefins. CO is another valuable product that can be produced from biomass.

The raw effluent from a CFP process is a complex mixture that comprises aromatics, olefins, oxygenates, paraffins, $H_2$, $CH_4$, CO, $CO_2$, water, char, ash, coke, catalyst fines, and a host of other compounds. Separation and recovery of the various components from this complex mixture present challenges that have not been solved satisfactorily. Recovery of CO from such a complex raw effluent mixture has not been reported.

In U.S. Pat. No. 6,342,091, a process is described for removal of $CO_2$, sulfur compounds, water, and aromatic and higher aliphatic hydrocarbons from industrial gases operated at elevated pressures. At least one morpholine derivative is used as the absorbent, and absorbent vapor is used as a stripping gas to remove $CO_2$ and other materials from the absorbent solvent. The latter process does not address a catalytic pyrolysis product mixture or the use of selective solvents. In U.S. Pat. No. 7,982,077, a process is described for separating $CO_2$ and sulfur containing materials from a paraffin-rich product stream from a high pressure hydrogenation and hydrodeoxygenation process using an amine absorber. The latter process does not recover a CO stream. In U. S. Patent Publication No. 2009/0077868A1, a process is described for separating $CO_2$ and sulfur-containing materials from a paraffin-rich product from a high pressure hydrogenation and hydrodeoxygenation process using an amine absorber and recycle of the sulfur compounds. The latter process does not address recovering CO. U.S. Pat. No. 8,535,613 describes an apparatus for separating acidic gases, $CO_2$ and $H_2S$, from syngas by converting CO in the syngas into $CO_2$ and removing $H_2S$ contained in the syngas by using a solvent for physical absorption. No CO recovery is attempted. In U. S. Patent Publication No. 2009/0133437A1, a process is described for separating a CO-rich stream from a stream containing hydrogen, CO, methane, and heavier components through a series of cryogenic separations. The latter process does not use solvent.

In U. S. Patent Publication No. 2014/0107306 A1, a method and apparatus are described for pyrolysis of biomass and conversion of at least one pyrolysis product to another chemical compound. The latter method comprises feeding a hydrocarbonaceous material to a reactor, pyrolyzing within the reactor at least a portion of the hydrocarbonaceous material under reaction conditions sufficient to produce one or more pyrolysis products, catalytically reacting at least a portion of the pyrolysis products, separating at least a portion of the hydrocarbon products, and reacting a portion of the hydrocarbon products to produce a chemical intermediate. A stream rich in CO is not recovered in the latter method.

In U.S. Pat. No. 8,277,643, U. S. Patent Publication No. 2012/0203042 A1, and U. S. Patent Publication No. 2013/0060070 A1, each incorporated herein by reference, apparatus and process conditions suitable for CFP are described. A stream rich in CO is not recovered in the described processes. Similarly, U. S. Patent Publication No. 2013/00324772 A1 discloses a process which may comprise sending the gaseous fraction of a reaction product to a vapor recovery system, but a stream rich in CO is not recovered in the process.

In light of current commercial practices and the disclosures of art, a simple economical process for separating and recovering CO from the product effluent of a catalytic pyrolysis process is needed. The present invention provides such a process.

SUMMARY OF THE INVENTION

Various aspects of the present invention include increased yield of useful products, improved energy efficiency, isolation and recovery of especially desirable products, and reduced emissions. The present invention provides for these aspects in an economical improved process for recovering CO from a CFP process product effluent by separating and recovering at least a portion of the products of the CFP process into various phase fractions, and recovering CO. An embodiment of the present process comprises the steps of: a) providing a first vapor phase stream resulting from a CFP process comprising, on a water-free and solids-free basis, from 25 to 80% CO and at least 15% $CO_2$, b) mixing the first vapor phase stream of step a) with solvent having an absorption capacity for $CO_2$ that is at least 5 times the absorption capacity of the solvent for CO to make a mixed phase stream, c) separating the mixed phase stream of step b) into a second vapor phase stream comprising CO and a liquid phase stream, and d) recovering a product stream from the second vapor phase stream of step c) having a higher concentration of CO and a lower concentration of $CO_2$ than the first vapor phase stream of step a).

Another embodiment of the invention process comprises the first vapor phase stream of step a) being produced by quenching a product effluent stream from a CFP process, said product effluent stream comprising, on a water-free and solids-free basis, at least 20% CO, with water at conditions of −5 to 100° C., such as 10 to 100° C., for example 40 to 80° C., to produce a quench stream, and treating the quench stream to separate it into the first vapor phase stream and a liquid phase stream. The quench stream treating step comprises compressing the quench stream at conditions of 100 to 8000 kPa, for example 600 to 2000 kPa, and cooling the compressed stream at conditions of −30 to 60° C., for example 5 to 30° C.

Another embodiment of the invention process comprises further steps of: e) further separating the liquid phase stream of step c) to form a third vapor phase stream comprising $CO_2$, and f) recovering a second product stream comprising at least 50% $CO_2$, such as, for example, from 50 to 99% $CO_2$, from the third vapor phase stream of step e).

Another embodiment of the invention process comprises a further step following steps e) and f) of: g) recycling at least a portion of the second product stream of step f) to the CFP process from which the first vapor phase stream of step a) results.

DETAILED DESCRIPTION OF THE INVENTION

Figure 1:
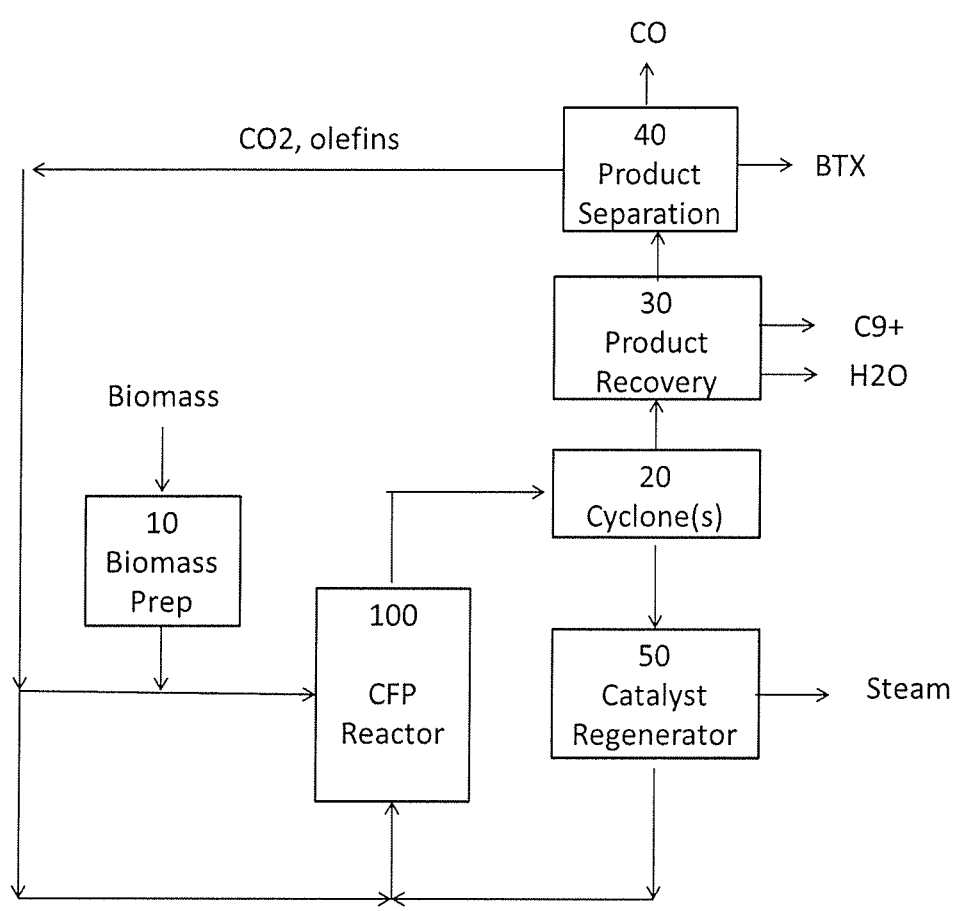
FIG. 1 is a schematic illustration of a process for converting biomass into aromatics and CO.

As a result of extensive research in view of the above, we have found that we can economically and effectively recover CO from a CFP process product effluent by separating and recovering at least a portion of the product of the CFP process into various phase fractions, and recovering CO by way of a series of sequential steps.

The present improved process comprises steps of: a) providing a first vapor phase stream resulting from a CFP process comprising, on a water-free and solids-free basis, from 25 to 80% CO and at least 15% $CO_2$, b) mixing the first vapor phase stream of step a) with solvent having an absorption capacity for $CO_2$ that is at least 5 times the absorption capacity of the solvent for CO to make a mixed phase stream, c) separating the mixed phase stream of step b) into a second vapor phase stream comprising CO and a liquid phase stream, and d) recovering a product stream from the second vapor phase stream of step c) having a higher concentration of CO and a lower concentration of $CO_2$ than the first vapor phase stream of step a); optionally followed by steps of: e) further separating the liquid phase stream of step c) to form a third vapor phase stream comprising $CO_2$, and f) recovering a second product stream comprising at least 50% $CO_2$ from the third vapor phase stream of step e); optionally followed by step: g) recycling at least a portion of the second product stream of step f) to the CFP process from which the first vapor phase stream comprising CO of step a) results.

As used herein, the terms "aromatics" or "aromatic compound" refer to a hydrocarbon compound or compounds comprising one or more aromatic groups such as, for example, single aromatic ring systems (e.g., benzyl, phenyl, etc.) and fused polycyclic aromatic ring systems (e.g., naphthyl, 1,2,3,4-tetrahydronaphthyl, etc.). Examples of aromatic compounds include, but are not limited to, benzene, toluene, indane, indene, 2-ethyltoluene, 3-ethyltoluene, 4-ethyltoluene, trimethylbenzene (e.g., 1,3,5-trimethylbenzene, 1,2,4-trimethylbenzene, 1,2,3-trimethylbenzene, etc.), ethylbenzene, styrene, cumene, n-propylbenzene, xylenes (e.g., p-xylene, m-xylene, o-xylene), naphthalene, methylnaphthalene (e.g., 1-methylnaphthalene), anthracene, 9,10-dimethylanthracene, pyrene, phenanthrene, dimethyl naphthalene (e.g., 1,5-dimethylnaphthalene, 1,6-dimethylnaphthalene, 2,5-dimethylnaphthalene, etc.), ethyl naphthalene, hydrindene, methylhydrindene, and dimethylhydrindene. Single ring and/or higher ring aromatics may also be produced in some embodiments. Aromatics also include single and multiple ring compounds that contain heteroatom substituents, i.e., phenol, cresol, benzofuran, aniline, indole, etc.

As used herein, the term "biomass" has its conventional meaning in the art and refers to any organic source of energy or chemicals that is renewable. Its major components can be: (1) trees (wood) and all other vegetation; (2) agricultural products and wastes (corn, fruit, garbage ensilage, etc.); (3) algae and other marine plants; (4) metabolic wastes (manure, sewage), and (5) cellulosic urban waste. Examples of biomass materials are described, for example, in Huber, G. W. et al, "Synthesis of Transportation Fuels from Biomass: Chemistry, Catalysts, and Engineering," Chem. Rev. 106, (2006), pp. 4044-4098.

Biomass is conventionally defined as the living or recently dead biological material that can be converted for use as fuel or for industrial production. The criterion as biomass is that the material should be recently participating in the carbon cycle so that the release of carbon in the combustion process results in no net increase averaged over a reasonably short period of time (for this reason, fossil fuels such as peat, lignite and coal are not considered biomass by this definition as they contain carbon that has not participated in the carbon cycle for a long time so that their combustion results in a net increase in atmospheric carbon dioxide). Most commonly, biomass refers to plant matter grown for use as biofuel, but it also includes plant or animal matter used for production of fibers, chemicals or heat. Biomass may also include biodegradable wastes or byproducts that can be burned as fuel or converted to chemicals, including municipal wastes, green waste (the biodegradable waste comprised of garden or park waste, such as grass or flower cuttings and hedge trimmings), byproducts of farming including animal manures, food processing wastes, sewage sludge, and black liquor from wood pulp or algae. Biomass excludes organic material which has been transformed by geological processes into substances such as coal, oil shale or petroleum. Biomass is widely and typically grown from plants, including miscanthus, spurge, sunflower, switchgrass, hemp, corn (maize), poplar, willow, sugarcane, and oil palm (palm oil) with the roots, stems, leaves, seed husks and fruits all being potentially useful. Processing of the raw material for introduction to the processing unit may vary according to the needs of the unit and the form of the biomass.

As used herein, the terms "olefin" or "olefin compound" (a.k.a. "alkenes") have their ordinary meaning in the art, and refer to any unsaturated hydrocarbon containing one or more pairs of carbon atoms linked by a double bond. Olefins include both cyclic and acyclic (aliphatic) olefins, in which the double bond is located between carbon atoms forming part of a cyclic (closed ring) or of an open chain grouping, respectively. In addition, olefins may include any suitable number of double bonds (e.g., monoolefins, diolefins, triolefins, etc.). Examples of olefin compounds include, but are not limited to, ethene, propene, allene (propadiene), 1-butene, 2-butene, isobutene (2-methylpropene), butadiene, and isoprene, among others. Examples of cyclic olefins include cyclopentene, cyclohexene, and cycloheptene, among others. Aromatic compounds such as toluene are not considered olefins; however, olefins that include aromatic moieties are considered olefins, for example, benzyl acrylate or styrene.

As used herein, the term 'oxygenate" includes any organic compound that contains at least one atom of oxygen in its structure such as alcohols (e.g., methanol, ethanol, etc.), acids (e.g., acetic acid, propionic acid, etc.), aldehydes (e.g., formaldehyde, acetaldehyde, etc), esters (e.g., methyl acetate, ethyl acetate, etc.), ethers (e.g., dimethyl ether, diethyl ether, etc.), aromatics with oxygen containing substituents (e.g., phenol, cresol, benzoic acid etc.), cyclic ethers, acids, aldehydes, and esters (e.g. furan, furfural, etc.), and the like.

As used herein, the terms "pyrolysis" and "pyrolyzing" have their conventional meaning in the art and refer to the transformation of a compound, e.g., a solid hydrocarbonaceous material, into one or more other substances, e.g., volatile organic compounds, gases and coke, by heat, preferably without the addition of, or in the absence of, oxygen. Preferably, the volume fraction of oxygen present in a pyrolysis reaction chamber is 0.5% or less. Pyrolysis may take place with or without the use of a catalyst. "Catalytic pyrolysis" refers to pyrolysis performed in the presence of a catalyst, and may involve steps as described in more detail below. Catalytic fast pyrolysis (CFP) that involves the conversion of biomass in a catalytic fluid bed reactor to produce a mixture of aromatics, olefins, and a variety of other materials is a particularly beneficial pyrolysis process. Examples of catalytic pyrolysis processes are outlined, for example, in Huber, G. W. et al, "Synthesis of Transportation Fuels from Biomass: Chemistry, Catalysts, and Engineering," Chem. Rev. 106, (2006), pp. 4044-4098, incorporated herein by reference.

As used herein, the term "recovery" of a component is the fraction (or percent) of that component that is present in the recovered product stream(s) compared to the amount of that component that is present in the reactor effluent stream. For example if 10 grams of "A" is present in the reactor effluent and 8.5 grams of "A" is present in the recovered product stream, then the recovery of "A" is 8.5/10 or 0.85 (85%). All percentages provided herein are by mass unless otherwise indicated.

The catalyst useful in the CFP process includes those containing internal porosity selected according to pore size (e.g., mesoporous and pore sizes typically associated with zeolites), e.g., average pore sizes of less than about 100 Angstroms (Å), for example, less than about 10 Å, such as less than about 5 Å, or smaller. In some embodiments, catalysts with average pore sizes of from about 5 to about 100 Å may be used. In some embodiments, catalysts with average pore sizes of between about 5.5 and about 6.5 Å, or between about 5.9 and about 6.3 Å may be used. In some embodiments, catalysts with average pore sizes of between about 7 and about 8 Å, or between about 7.2 and about 7.8 Å may be used.

In preferred embodiments of the CFP process, the catalyst may be selected from naturally occurring zeolites, synthetic zeolites and combinations thereof. In certain embodiments, the catalyst may have the structure of ZSM-5, as would be understood by those skilled in the art. Optionally, such a catalyst can comprise acidic sites. Other types of zeolite catalysts include those having the structure of ferrierite, zeolite Y, zeolite Beta, mordenite, MCM-22, ZSM-23, ZSM-57, SUZ-4, EU-1, ZSM-11, SAPO-31, SSZ-23, among others. In other embodiments, non-zeolitic catalysts may be used; for example, $WO_x/ZrO_2$, aluminum phosphates, etc. In some embodiments, the catalyst may comprise a metal and/or a metal oxide. Suitable metals and/or oxides include, for example, nickel, palladium, platinum, titanium, vanadium, chromium, manganese, iron, cobalt, zinc, copper, gallium, and/or any of their oxides, among others. In some embodiments promoter elements chosen from among the rare earth elements, i.e., elements 57-71, cerium, zirconium or their oxides or combinations thereof may be included to modify activity or structure of the catalyst. In addition, in some cases, properties of the catalysts (e.g., pore structure, type and/or number of acid sites, etc.) may be chosen to selectively produce a desired product.

Examples of apparatus and process conditions suitable for the CFP process are described in U.S. Pat. No. 8,277,643 and in US Patent Application 2013/0060070A1, each incorporated herein by reference. Conditions for CFP of biomass may include one or a combination of the following features (which are not intended to limit the broader aspects of the invention): a zeolite catalyst such as one having the structure of ZSM-5; a zeolite catalyst comprising a metal selected from the group consisting of titanium, vanadium, chromium, manganese, iron, cobalt, nickel, copper, zinc, gallium, platinum, palladium, silver, phosphorus, sodium, potassium, magnesium, calcium, tungsten, zirconium, cerium, lanthanum, and combinations thereof; a fluidized bed, circulating bed, or riser reactor; an operating temperature in the range of 300 to 1000° C.; and a solid catalyst-to-biomass mass ratio of from 0.1 to 40.

Referring more particularly to FIG. 1 which illustrates a CFP process for converting biomass to aromatics (e.g. BTX), CO, and other components (e.g. $C_9^+$), thereby providing a first vapor phase stream useful in step a) of the present process. Biomass is introduced to and prepared in stage 10 by chipping, drying, grinding, or other processes, or some combination of these. The prepared biomass is introduced along with catalyst and recycle gas or transport fluid into the CFP reactor 100. The CFP reactor is a fluidized bed catalytic reactor that is fluidized by a portion of recycle gas or other fluid or recycle gas and another fluid. The product stream from the CFP reactor 100 is separated from some of the catalyst, minerals, or char that is carried along with the fluid stream in one or more cyclones 20. The catalyst from the cyclones and other catalyst removed from the reactor (not shown) are regenerated in a catalyst regeneration system 50 in which coke and char are combusted and the regenerated catalyst is returned to the reactor 100. The raw fluid product stream is sent to a product recovery system 30 where the fluid product stream is quenched and the heavy liquid products such as naphthalenes, oxygenates, water, char, coke, ash, catalyst fines, and other useful products are recovered and separated from a vapor phase stream comprising CO, $CO_2$, $CH_4$, $H_2$, light olefins and paraffins, and benzene, toluene, and xylenes. The crude mixture of BTX, CO, $CO_2$, and other products is separated into various fractions in separation step 40 producing a CO-containing stream, various fractions of benzene, toluene and xylenes, and a gas stream comprising $CO_2$, $CH_4$, $H_2$, light olefins and paraffins. A portion of the $CO_2$-containing gas stream is purged, and a portion of that may be optionally recycled for use in the CFP reactor 100.

The CFP reactor 100 may be operated at a temperature from 300 to 1000° C., and the product stream from reactor 100 is typically at a temperature of 300 to 620° C., such as 400 to 575° C., for example 500 to 550° C., and a pressure of 100 kPa to 1500 kPa, such as 200 kPa to 1000 kPa, for example 300 kPa to 700 kPa (pressures expressed as absolute pressures). The raw product stream from reactor 100 comprises aromatics, olefins, oxygenates, paraffins, $H_2$, $CH_4$, CO, $CO_2$, water, char, ash, coke, catalyst fines, and a host of other components. The raw product stream can comprise 20 to 60%, such as 25 to 55%, for example 30 to 50% CO; 10 to 50%, such as 15 to 40%, for example 20 to 35% $CO_2$; 0.1 to 10%, such as 0.2 to 5%, for example 0.3 to 1.0% $H_2$; 2 to 15%, such as 3 to 10%, for example 4 to 8% $CH_4$; 2 to 40%, such as 3 to 35%, for example 4 to 30%, BTX; 0.1 to 10%, such as 0.2 to 5%, for example 0.3 to 3% oxygenates; and 1 to 15%, such as 2 to 10%, for example 3 to 6% $C_2$-$C_4$ olefins. The raw product stream can comprise a vapor mixture where the sum of CO and $CO_2$ is 30 to 90%, such as 40 to 85%, for example 50 to 80%. These values are on a water- and solids-free basis.

Figure 2:
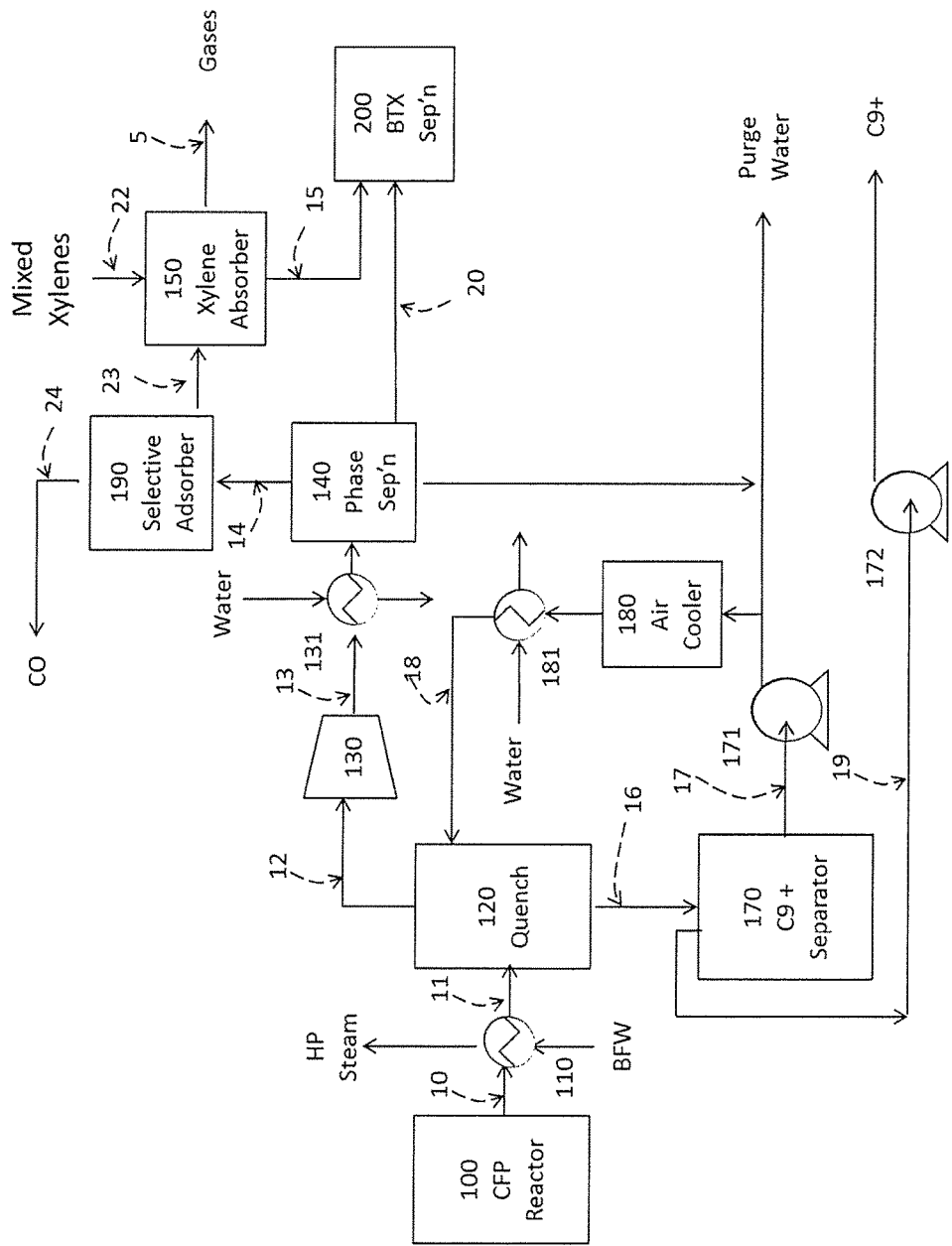
FIG. 2 is a schematic illustration of a process for converting biomass into aromatics and CO.

Referring more particularly to FIG. 2 which illustrates a CFP process for converting biomass and a quench and recovery system, thereby providing a first vapor phase stream useful in step a) of the present process. In FIG. 2 the CFP reactor 100 produces a product stream 10 at a high temperature which is cooled in heat exchanger 110 and sent via line 11 to a quench system 120. The raw product effluent is passed through at least one cyclone (not shown, see FIG. 1) that removes much of the solids in the mixture. In one option a venturi scrubber (not shown) is placed upstream of the quench system 120 to remove additional particulates including char, coke, catalyst and ash. The quench system 120 contacts a stream of water provided by line 18 with the gaseous product stream. This quenching water may comprise reaction product water made by pyrolysis and catalytic conversion of biomass. The product stream from the quench system 120 includes: a condensed stream that comprises water and organics comprising $C_9^+$ aromatics, oxygenates, and other compounds, and solids, and a gas/vapor product stream that comprises benzene, toluene, xylenes, CO, $CO_2$, $CH_4$, $N_2$, $H_2$, $C_2$-$C_4$ olefins and paraffins, and other compounds. The gas/vapor product stream from quench system 120 is passed via line 12 to a compressor 130 and, via line 13, to heat exchanger 131. Heat exchanger 131 cools the stream and condenses recoverable hydrocarbon products such as benzene, toluene, and xylenes. This cooling and condensing can optionally be performed by air cooled, water cooled, or chilled water cooled exchangers, or some combination of these. The compressed and cooled product stream is passed to a 3-phase separator 140. At least a portion of gaseous stream 14, the first vapor phase stream useful in step a) of the present process, from separator 140 is sent to a selective absorber 190 in which the gas stream is scrubbed with a solvent, hereinafter more particularly described, that selectively adsorbs $CO_2$, aromatics, and other hydrocarbons, and allows CO, $H_2$, and $CH_4$ to pass as gases via stream 24. The balance of gaseous stream 14 may be recycled to the CFP reactor or otherwise used in the process or purged. The solvent that comprises the $CO_2$, aromatics, and other hydrocarbons is heated (not shown) to release $CO_2$, aromatics, and other hydrocarbons and form a lean solvent that is recycled to absorber 190. The vapor mixture of $CO_2$, aromatics, and other hydrocarbons is optionally fed to absorber 150 via stream 23 in which the gases are scrubbed with a mixed-xylenes containing absorption liquid stream 22 obtained from the BTX separation or other liquid stream recovered from the process, to recover BTX from the gas mixture. The liquid product from absorber 150 is optionally combined via stream 15 with the liquid phase from separator 140 via stream 20, and the combined product stream may be sent to a BTX separation unit 200. Alternatively, a liquid stream from separator 140 and absorber 150 may be separately sent to a distillation unit in a separation train (not shown). The gas stream from absorber 150 that comprises the lighter components and fixed gases ($CO_2$, $C_2$-$C_4$ olefins and alkanes, etc.) may in part be sent back to the reactor 100 to fluidize the catalyst and provide a source of reactive olefins which can react in the presence of biomass to produce additional aromatic product. Any gas in excess of reactor fluidizing and olefin reaction requirements can be used for other processing needs, combusted, or purged. The aqueous stream from phase separator 140 is sent to a water purge stream. The water and high boiling point components from quench system 120 are sent to a water/organic separator 170 via line 16. The organic phase from separator 170 that comprises $C_9^+$ aromatics (stream 19) is pumped by pump 172 and sent to storage, or a portion may be used in the process. The water phase (stream 17) from separator 170 is pumped by pump 171 and a portion of stream 17 may be passed through optional air cooler 180, heat exchanger 181, and recycled to the quench system 120. Filters (not shown) can be placed after separator 170 or at other locations in the flow scheme to remove particulates, char, and catalyst fines from the organic and water streams. The remainder of the water is purged from the system and sent to water treatment or otherwise utilized.

The quenching with water in the quench system may be conducted at conditions of temperature from −5 to 200° C., such as from 10 to 100° C., for example from 40 to 80° C., and pressure of 150 to 1500 kPa, for example from 300 to 700 kPa. The quench stream treating step comprises compressing the quench stream at conditions of 100 to 8000 kPa, for example 600 to 2000 kPa, and cooling the compressed stream at conditions of −30 to 60° C., for example 5 to 30° C.

Figure 3:
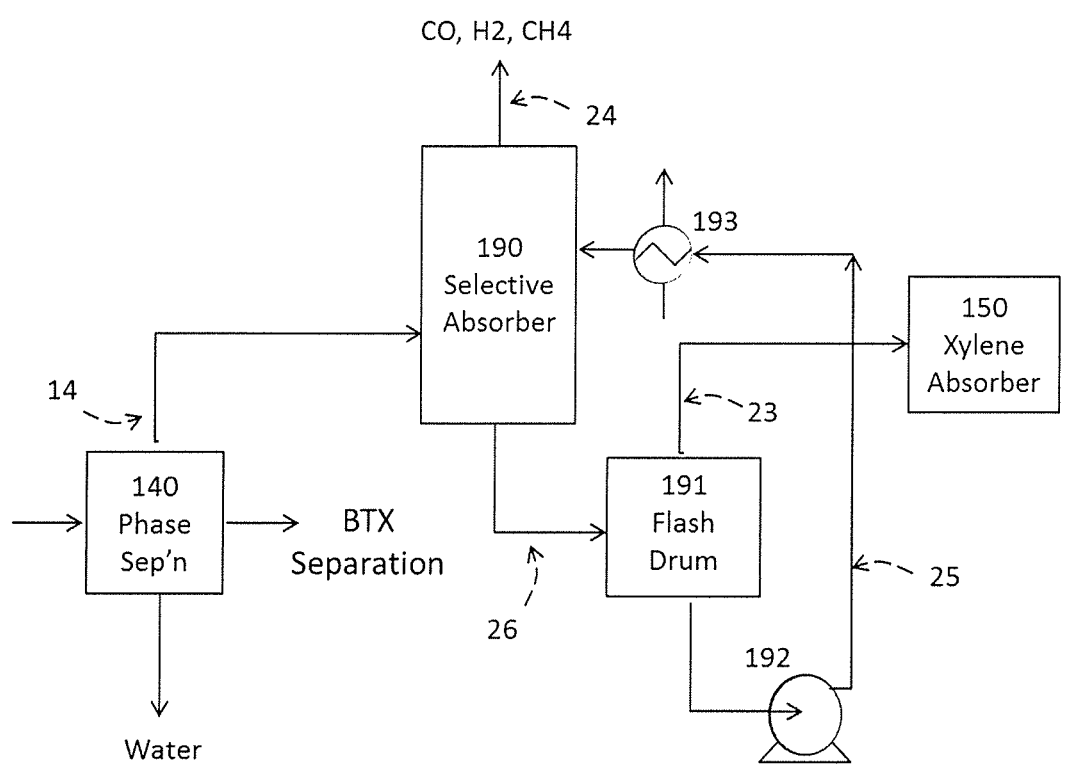
FIG. 3 is a schematic illustration of a process embodiment of the present invention.

Referring more particularly to FIG. 3 which illustrates an embodiment of a separation scheme for separating CO from the vapor stream exiting the quench unit 120 in FIG. 2. The compressed and cooled quench overhead stream is separated into liquid and vapor phases. The aqueous phase is sent to water treatment. The organic liquid phase is passed on to a BTX separation and preliminary purification system (not shown). The vapor phase stream 14, the first vapor phase stream useful in step a) of the present process, from phase separator 140 is passed into a selective absorber 190. In selective absorber 190 the vapor is contacted with a selective solvent, hereinafter more particularly described, that selectively absorbs $CO_2$, $H_2S$, $C_2^+$ paraffins and olefins, aromatics, and other materials and does not substantially absorb CO, $H_2$, $CH_4$, and $N_2$. The scrubbed effluent vapor phase stream 24 is rich in CO and is sent for further purification or is used or sold without further treatment. The absorber solvent that has absorbed $CO_2$, aromatics, olefins, and other materials is passed via stream 26 into flash drum 191 where the absorbed vapors comprising $CO_2$, $C_2^+$ paraffins and olefins, aromatics, and other materials desorb into a vapor phase. The vapor phase from flash drum 191 is optionally fed via stream 23 to a xylenes absorber 150, and the lean solvent via stream 25 is compressed in compressor 192, cooled in heat exchanger 193, and returned to selective absorber 190.

Figure 4:
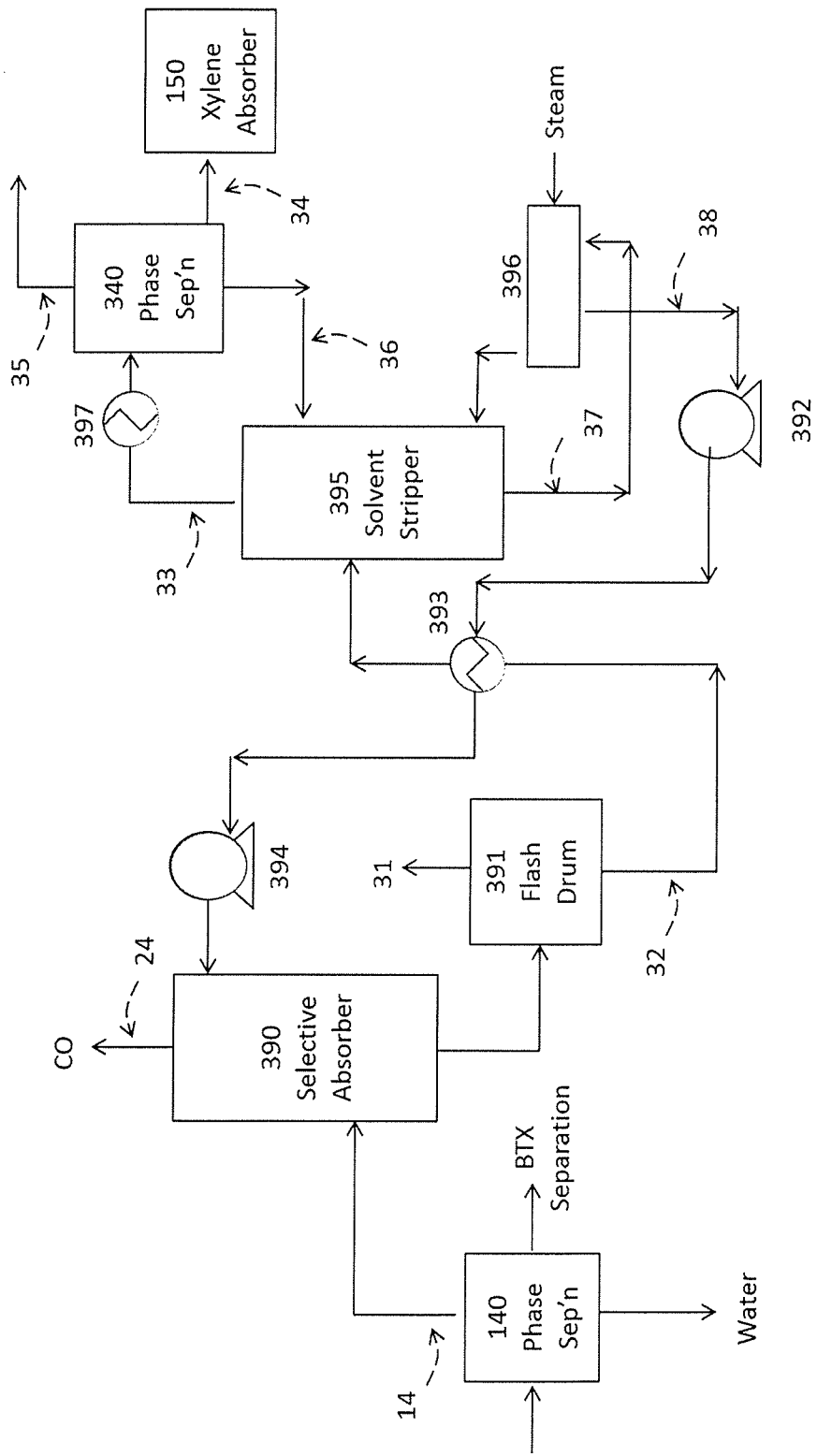
FIG. 4 is a schematic illustration of a process embodiment of the present invention.

Referring more particularly to FIG. 4 which illustrates an embodiment of a separation scheme for separating CO from the vapor stream exiting the quench unit 120 in FIG. 2. The compressed and cooled quench overhead stream is separated into liquid and vapor phases. The aqueous phase is sent to water treatment or otherwise utilized. The organic liquid phase is passed on to a BTX separation and preliminary purification system (not shown). The vapor phase stream 14, the first vapor phase stream useful in step a) of the present process, from phase separator 140 is passed to a selective absorber 390. In selective absorber 390 the vapor contacts a selective absorption solvent, hereinafter more particularly described, that absorbs $CO_2$, $C_2^+$ paraffins and olefins, aromatics, and other materials and does not substantially absorb CO, $H_2$, $CH_4$, and $N_2$. The scrubbed effluent vapor phase stream 24 from selective absorber 390 is rich in CO and is sent for further purification or is used or sold without further treatment. The absorber solvent that has absorbed $CO_2$, aromatics, olefins and other materials is passed into flash drum 391 where a portion of the absorbed vapors comprising $CO_2$, $C_2^+$ paraffins and olefins, aromatics, and other materials desorb and are drawn out of the flash drum 391 via vapor phase stream 31. Optionally there are multiple flash drums in series. The vapor phase stream 31 liberated in flash drum 391 can be fed to the xylenes absorber 150 (also see FIG. 3) or can be combined with another vapor stream for use as recycle or fluidization gas for the CFP reactor 100 (see FIG. 1 or 2), or purged. The solvent stream 32 comprising $CO_2$, $C_2^+$ paraffins and olefins, aromatics, and other materials, is heated in heat exchanger 393 and fed to a solvent stripper unit 395. In the solvent stripper a portion of the dissolved materials including $CO_2$, $C_2^+$ paraffins and olefins, aromatics, and other materials are liberated into the vapor phase stream 33 and the stripped solvent is passed to mixer 396 via stream 37 where it is mixed with steam, and the vapors are returned to the solvent stripper 395. The vapor stream 33 is optionally compressed, cooled and condensed in heat exchanger 397 and passed to phase separator 340. From phase separator 340 the vapor phase stream 35 comprising largely $CO_2$ and $C_2^+$ paraffins and olefins can in part be returned to the CFP process as recycle gas, fluidization gas, or used for other purposes, or purged. The organic liquid phase stream 34 comprising aromatics and other materials condensed in phase separator 340 is optionally passed to a xylene absorber 150 for further purification or it can be passed directly to a product purification train (not shown), or can be used elsewhere in the process or purged. The aqueous phase stream 36 from phase separator 340 is returned to solvent stripper 395. The lean solvent stream 38 from mixer 396 is compressed in compressor 392, cooled by heat exchange against stream 32 in heat exchanger 393, optionally compressed in compressor 394 and returned to the selective absorber 390.

The solvent required in the process of the present invention must be selective for $CO_2$, aromatics, and olefins absorption in mixtures with CO and $H_2$. This required solvent has an absorption capacity for $CO_2$ that is at least 5 times, or at least 10 times, the absorption capacity of the solvent for CO. Examples of such solvent include Selexol®, dialkylammonium dialkylcarbamates, polydimethyl siloxane (PDMS), polypropyleneglycol dimethylether (PPGDME), and combinations thereof. Selexol®, sold by The Dow Chemical Company and its affiliates, is a dimethyl ether of polyethylene glycol of the general formula [$CH_3$—O—($CH_2$—$CH_2$—O)$_n$—$CH_3$], where n ranges from 3 to 10, or mixture thereof. The published primary use for Selexol® is to remove acid gases and other contaminants from various gas streams by physical absorption, not chemical reaction typical of amine solvents. A benefit of this process is that the energy required to regenerate a physical solvent such as Selexol® is significantly less than the energy needed to regenerate a chemical (amine) solvent. In addition, since the acid gas removal capacity of Selexol® is only dependent on physical absorption, it is possible to achieve much higher amounts of acid gas absorbed in the solvent, as compared to amines. The relative absorption capacities of Selexol® for various components compared to $CH_4$ are presented in Table 1. Data in Table 1 are from "Using physical solvent in multiple applications"—Jack Mcjannett—DOW—digital refining 2012 (http://www.digitalrefining.com/data/articles/file/1312419751.pdf).

TABLE 1

| Component | R = K'Component/K'$CH_4$ |
| --- | --- |
| $H_2$ | 0.2 |
| $N_2$ | 0.3 |
| CO | 0.43 |
| $CH_4$ | 1 |
| $C_2H_6$ | 7.2 |
| $CO_2$ | 15.2 |
| $C_3H_8$ | 15.4 |
| n-$C_4H_{10}$ | 36 |
| COS | 35 |
| $NH_3$ | 73 |
| n-$C_5H_{12}$ | 83 |
| $H_2S$ | 134 |
| $C_6H_{14}$ | 167 |
| $CH_3SH$ | 340 |
| $C_7H_{16}$ | 360 |
| $CS_2$ | 360 |
| $C_6H_6$ | 3,800 |
| $C_2H_5OH$ | 3,900 |
| $C_4H_4S$ | 8,200 |
| $H_2O$ | 11,000 |
| HCN | 19,000 |

The vapor phase stream 14 of FIGS. 2, 3 and 4 that can be separated by use of selective absorber 190 or 390 comprises CO, $CO_2$, $H_2$, $N_2$, $CH_4$, $C_2H_6$, ethylene, propylene, aromatics, and other materials. The composition of vapor phase stream 14 that can be effectively separated in the present process comprises from 25 to 80%, such as from 35 to 70%, for example from 40 to 65% CO. Vapor phase stream 14 comprises at least 15%, or from 15 to 60%, such as from 20 to 50%, for example from 25 to 45% $CO_2$. The vapor phase stream 14 further comprises from 0.1 to 10%, such as from 0.2 to 8%, for example from 0.5 to 6% ethylene; from 0.1 to 5%, such as from 0.5 to 4%, for example from 0.8 to 3% propylene; from 0.1 to 20%, such as from 0.2 to 10%, for example from 0.5 to 5% hydrogen; from 1 to 25%, such as from 3 to 20%, for example from 5 to 15% methane; and from 0.1 to 20%, such as from 0.2 to 10%, for example from 0.5 to 5% aromatics. These values are on a water- and solids-free basis.

Stream 17 from separator 170 of FIG. 2 comprises a water product or recycle stream, or both. Stream 17 comprises, on a solids-free basis, at least 85%, or from 85 to 99.8% water; at most 10%, or from 0.1 to 10%, such as from 0.5 to 5%, for example from 1 to 3% aromatics; at most 10%, or from 0.05 to 10%, such as from 0.1 to 5%, for example from 0.5 to 2% oxygenates; at most 2%, or from 0.0001 to 2%, such as from 0.0005 to 1%, for example from 0.001 to 0.1% BTX.

Stream 19 from separator 170 of FIG. 2 comprises $C_9^+$ aromatics. Stream 19 comprises, on a solids-free basis, at least 60%, or from 60 to 99.8%, such as from 80 to 99.8%, for example from 90 to 99.8% aromatics; at least 70%, or from 70 to 99%, such as from 75 to 95%, for example from 80 to 90% $C_9^+$ aromatics; at least 40%, or from 40 to 90%, such as from 50 to 80%, for example from 60 to 70% naphthalene; at least 40%, or from 40 to 90%, such as from 50 to 80%, for example from 60 to 70% polycyclic aromatics; at most 25%, or from 1 to 25%, for example from 5 to 20% monocyclic aromatics; at most 25%, or from 0.1 to 25%, such as from 1 to 15%, for example from 2 to 10% oxygenates; at most 5%, or from 0.001 to 5%, such as from 0.01 to 3%, for example from 0.05 to 1.5% water.

Stream 20 from phase separator 140 of FIG. 2 comprises benzene, toluene, and xylenes (collectively BTX). Stream 20 comprises, on a solids-free basis, at least 50%, or from 50 to 99%, such as from 65 to 99%, for example from 75 to 95% BTX. The water content of stream 20 is at most 10%, or from 0.01 to 10%, such as from 0.05 to 5%, for example from 0.10 to 1%. The oxygenate content of stream 20 is at most 5%, or from 0.01 to 5%, such as from 0.03 to 2%, for example from 0.05 to 1%.

Stream 24 from selective absorber 190 or 390 of FIG. 2, 3 or 4 comprises a higher concentration of CO and a lower concentration of $CO_2$ than stream 14. Stream 24 comprises, on a water- and solids-free basis, at least 40%, or at least 75%, or from 40 to 99%, such as from 60 to 97%, for example from 70 to 95% CO; and at most 1%, or at most 0.01%, or from 0.00005 to 1%, such as from 0.00015 to 0.1%, for example from 0.00020 to 0.01% $CO_2$, with the concentration of CO being higher and the concentration of $CO_2$ being lower than that of stream 14. For example, in a particular situation, if the concentrations of CO and $CO_2$ in stream 14 are 50% and 35%, respectively, they may be 90% and 0.0003%, respectively, in stream 24.

The steps of the improved process of the present invention may be conducted at conditions of temperature, pressure and flow rate depending on the composition of the process stream and the desired recovery of the various products. For example, the pressure of the selective solvent absorber 190 or 390 can range from 100 kPa to 10,000 kPa (1 to 100 bara), such as from 200 kPa to 5,000 kPa (2 to 50 bara), for example from 500 kPa to 2,000 kPa (5 to 20 bara). The temperature in the selective solvent absorber 190 or 390 can range from −10 to 100° C., such as from 0 to 50° C., for example from 3 to 25° C.

The flash drum 191 or 391 of FIG. 3 or 4 used to recover a vapor from the solvent by pressure reduction can be operated at a pressure from 100 kPa to 1,000 kPa (1 to 10 bara), such as from 120 kPa to 500 kPa (1.2 to 5 bara), for example from 150 kPa to 200 kPa (1.5 to 2 bara). The temperature of the flash drum 191 or 391 can be from 10 to 250° C., such as from 50 to 150° C., for example from 75 to 125° C. These conditions may be adjusted within the ranges to optimize the cost and efficiency of the process.

The solvent stripper 395 of FIG. 4 can be operated at 100 to 300° C., such as from 150 to 275° C., for example from 200 to 250° C. The pressure of the solvent stripper 395 can range from 100 kPa to 1,500 kPa (1 to 15 bara), such as from 100 kPa to 1,000 kPa (1 to 10 bara), for example from 120 kPa to 500 kPa (1.2 to 5 bara), or from 150 kPa to 300 kPa (1.5 to 3 bara). These conditions may be adjusted within the ranges to optimize the cost and efficiency of the process.

The novel arrangement of unit operations and process conditions required of the present process facilitates the separation and recovery of a valuable CO stream from a biomass upgrading process. This reduces the volume of vapor that must be separated in the aromatics separation scheme, thus reducing costs and sizes of equipment and improving efficiency. This also reduces the volume of the gases that are recycled to the process thus providing enhanced process flexibility. The inventive process increases the concentration of $CO_2$ and olefins in the gas stream that is available for recycle, thus increasing olefin conversion and improving aromatics productivity. An unexpected benefit of the present process is the potential for eliminating the xylenes absorber to collect the aromatics that are present in the vapors from the phase separator, thus reducing the number of unit operations in a CFP product purification process.

The following Example demonstrates the present invention and its capability for use. The invention is capable of other and different embodiments, and its several details are capable of modifications in various apparent respects, without departing from the spirit and scope of the invention. Accordingly, the Example is to be regarded as illustrative in nature and not as restrictive. All percentages are by mass unless otherwise indicated.

EXAMPLE

A model was constructed to calculate the separation of a CO-rich stream from a CFP product mixture in a single pass. A model of the vapor composition that exits the primary phase separator was entered into an Aspen® simulation of the CO separation process as depicted in FIG. 3. The compositions of the various process streams are summarized in Table 2. The fractional recoveries of the various components from the vapor feed stream that are recovered in the CO recovery stream and in the $CO_2$ recovery stream are presented in Table 3. The CO recovery stream is 90.8% by weight CO providing a 94.72% recovery of CO. Further, the recovered CO stream comprises only about 8% $CH_4$ and 1.1% $H_2$ by weight, making it a very valuable feed stream for a variety of processes using CO. The $CO_2$ recovery stream is 74.1% by weight $CO_2$ and the fractional recovery of $CO_2$ is 57.6%. Moreover, the $CO_2$ stream also provides 54% recovery of the ethylene and 45% recovery of the propylene in the original vapor stream, approximately doubling the concentrations of these two materials compared to the original vapor stream, making it an excellent recycle stream for the CFP process.

TABLE 2

| Stream | 14 Separator Outlet | Solvent | 23 CO$_2$-rich Stream | 24 CO-rich Stream | 25 Spent Solvent | 26 Bottoms Solvent |
|---|---|---|---|---|---|---|
| T, °C. | 5 | 8 | 105 | 8.7 | 105 | 13.2 |
| P, bar | 9.013 | 9.013 | 1.513 | 9.013 | 1.513 | 9.013 |
| Flow, kg/hr | 145,074 | 3.2 × 10$^6$ | 39,915 | 78,022 | 3,227,140 | 3,267,050 |
| Fractions | | | | | | |
| H$_2$ | 0.006 | | 743 ppb | 0.011 | Trace | 9 ppb |
| N$_2$ | Trace | | | Trace | | Trace |
| CO | 0.516 | | 0.095 | 0.908 | 48 ppm | 0.001 |
| CO$_2$ | 0.354 | | 0.741 | 295 ppm | 0.007 | 0.016 |
| Methane | 0.071 | | 0.079 | 0.08 | 258 ppm | 0.001 |
| Propane | 0.001 | | 0.002 | 4 ppm | 26 ppm | 46 ppm |
| Ethylene | 0.029 | | 0.058 | 785 ppm | 585 ppm | 0.001 |
| Propylene | 0.013 | | 0.022 | 20 ppm | 332 ppm | 594 ppm |
| 1-Butene | 563 ppm | | 720 ppm | 12 ppb | 16 ppm | 25 ppm |
| n-Butane | 725 ppm | | 879 ppm | 55 ppb | 22 ppm | 32 ppm |
| n-Pentane | 111 ppm | | 83 ppm | Trace | 4 ppm | 5 ppm |
| Pentene | 173 ppm | | 140 ppm | Trace | 6 ppm | 8 ppm |
| n-Hexane | 36 ppm | | 15 ppm | Trace | 1 ppm | 2 ppm |
| 1-Hexene | 80 ppm | | 37 ppm | Trace | 3 ppm | 4 ppm |
| n-Octane | 2 ppm | | 262 ppb | Trace | 103 ppb | 105 ppb |
| 1-Heptene | 0.002 | | 525 ppm | Trace | 91 ppm | 96 ppm |
| Benzene | 0.004 | | 0.001 | Trace | 168 ppm | 181 ppm |
| Toluene | 0.002 | | 268 ppm | Trace | 77 ppm | 79 ppm |
| p-Xylene | 53 ppm | | 4 ppm | Trace | 2 ppm | 2 ppm |
| m-Xylene | 88 ppm | | 7 ppm | Trace | 4 ppm | 4 ppm |
| o-Xylene | 15 ppm | | 997 ppb | Trace | 679 ppb | 683 ppb |
| Ethylbenzene | 9 ppm | | 713 ppb | Trace | 391 ppb | 395 ppb |
| n-Propylbenzene | 49 ppb | | 2 ppb | Trace | 2 ppb | 2 ppb |
| Cumene | 3 ppm | | 167 ppb | Trace | 137 ppb | 137 ppb |
| 1,2,3-Trimethylphenol | 281 ppb | | 7 ppb | Trace | 13 ppb | 12 ppb |
| Styrene | 3 ppm | | 189 ppb | Trace | 140 ppb | 140 ppb |
| Benzofuran | 71 ppb | | 2 ppb | Trace | 3 ppb | 3 ppb |
| Aniline | 20 ppb | | Trace | Trace | Trace | Trace |
| Indole | Trace | | Trace | Trace | Trace | Trace |
| Indene | 9 ppb | | Trace | Trace | Trace | Trace |
| Naphthalene | 3 ppb | | Trace | Trace | Trace | Trace |
| 2-Methylnaphthalene | 4 ppb | | Trace | Trace | Trace | Trace |
| Phenol | 1 ppb | | Trace | Trace | Trace | Trace |
| m-Cresol | 6 ppb | | Trace | Trace | Trace | Trace |
| H$_2$O | 653 ppm | | 103 ppm | Trace | 28 ppm | 29 ppm |
| Solvent | | 1.000 | 39 ppb | 7 ppb | 0.992 | 0.979 |

TABLE 3

| | Fraction of component recovered | |
|---|---|---|
| Component | CO-rich Stream Stream 24 | CO$_2$-rich Stream Stream 23 |
| Hydrogen | 1.0000 | 0.0000 |
| CO | 0.9472 | 0.0507 |
| CO$_2$ | 0.0004 | 0.5760 |
| Methane | 0.6113 | 0.3073 |
| Propane | 0.0021 | 0.4403 |
| Ethylene | 0.0144 | 0.5438 |
| Propylene | 0.0008 | 0.4467 |
| 1-Butene | 0.0000 | 0.3521 |
| n-Butane | 0.0000 | 0.3336 |
| n-Pentane | 0.0000 | 0.2053 |
| Pentene | 0.0000 | 0.2222 |
| n-Hexane | 0.0000 | 0.1140 |
| 1-Hexene | 0.0000 | 0.1278 |
| n-Octane | 0.0000 | 0.0291 |
| 1-Heptene | 0.0000 | 0.0665 |
| Benzene | 0.0000 | 0.0797 |
| Toluene | 0.0000 | 0.0415 |
| p-Xylene | 0.0000 | 0.0213 |
| m-Xylene | 0.0000 | 0.0207 |
| o-Xylene | 0.0000 | 0.0179 |
| Ethylbenzene | 0.0000 | 0.0217 |
| Cumene | 0.0000 | 0.0156 |
| Styrene | 0.0000 | 0.0174 |

The results of this example unexpectedly show that a very high fraction of the CO in the product gases can be recovered by way of the present process. Furthermore, it is surprising that a stream with higher concentrations of CO$_2$, ethylene, and propylene that is a very valuable recycle stream can be produced by the present process. It is an unexpected benefit that the CO$_2$-rich stream produced by the process of this invention is suitable for recycle and can eliminate the need for recovering aromatics from this stream as the aromatics will return to the CFP reactor. Separation of a CO-rich stream reduces the volume of vapor that must be separated in the aromatics separation scheme, thus reducing costs and sizes of equipment and improving efficiency. This also reduces the volume of the gases that are recycled to the process thus providing enhanced process flexibility. The inventive process increases the concentration of CO$_2$ and olefins in the gas stream that is available for recycle, thus increasing olefin conversion and improving aromatics productivity.

All patents, patent applications, test procedures, priority documents, articles, publications, manuals, and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

While the illustrative embodiments of the invention have been described with particularity, it will be understood that various other modifications will be apparent to and may be readily made by those skilled in the art without departing from the spirit and scope of the invention. Accordingly, it is not intended that the scope of the claims hereof be limited to the examples and descriptions set forth herein but rather that the claims be construed as encompassing all the features of patentable novelty which reside in the present invention, including all features which would be treated as equivalents thereof by those skilled in the art to which the invention pertains.

What is claimed is:

1. An improved process for recovering CO from a catalytic fast pyrolysis process product effluent comprising steps of:
    a) providing a first vapor phase stream resulting from a catalytic fast pyrolysis process comprising, on a water-free and solids-free basis, from 25 to 80% CO and at least 15% $CO_2$,
    b) mixing the first vapor phase stream of step a) with solvent having an absorption capacity for $CO_2$ that is at least 5 times the absorption capacity of the solvent for CO to make a mixed phase stream,
    c) separating the mixed phase stream of step b) into a second vapor phase stream comprising CO and a liquid phase stream, and
    d) recovering a product stream from the second vapor phase stream of step c) having a higher concentration of CO and a lower concentration of $CO_2$ than the first vapor phase stream of step a).

2. The process of claim 1 wherein the first vapor phase stream of step a) is produced by quenching a product effluent stream from a catalytic fast pyrolysis process, said product effluent stream comprising, on a water-free and solids-free basis, at least 20% CO, with water at conditions of −5 to 100° C. to produce a quench stream, and treating the quench stream to separate it into the first vapor phase stream and a liquid phase stream.

3. The process of claim 2 wherein the quench stream treating step comprises compressing the quench stream at conditions of 100 to 8000 kPa, and cooling the compressed stream at conditions of −30 to 60° C.

4. The process of claim 1 wherein the solvent of step b) comprises a dimethyl ether of polyethylene glycol of the general formula [$CH_3$—O—($CH_2$—$CH_2$—O)$_n$—$CH_3$], where n ranges from 3 to 10.

5. The process of claim 1 wherein the solvent of step b) is selected form the group consisting of Selexol®, dialkylammonium dialkylcarbamates, polydimethyl siloxane (PDMS), polypropyleneglycol dimethylether (PPGDME), and combinations thereof.

6. The process of claim 5 wherein the solvent comprises Selexol®.

7. The process of claim 2 wherein the product effluent stream from a catalytic fast pyrolysis process comprises, on a water-free and solids-free basis, from 20 to 60% CO.

8. The process of claim 7 wherein the product effluent stream from a catalytic fast pyrolysis process comprises, on a water-free and solids-free basis, from 30 to 50% CO.

9. The process of claim 1 wherein the first vapor phase stream of step a) comprises from 35 to 70% CO and at least 20% $CO_2$.

10. The process of claim 9 wherein the first vapor phase stream of step a) comprises from 40 to 65% CO and at least 25% $CO_2$.

11. The process of claim 1 wherein the first vapor phase stream of step a) comprises from 15 to 60% $CO_2$.

12. The process of claim 1 wherein the first vapor phase stream of step a) comprises a compound selected from the group consisting of methane, ethane, ethylene, propane, propylene, butanes, butenes, pentanes, pentenes, aromatics, phenols, cresols, naphthalenes, indole, and combinations thereof.

13. The process of claim 1 wherein the product stream of step d) comprises from 50 to 99% CO, from 0.00005 to 1% $CO_2$, and less than 25% methane, wherein the concentration of CO is higher in the product stream of step d) than it is in the first vapor phase stream of step a), and the concentration of $CO_2$ is lower in the product stream of step d) than it is in the first vapor phase stream of step a).

14. The process of claim 1 further comprising steps of:
    e) further separating the liquid phase stream of step c) to form a third vapor phase stream comprising $CO_2$, and
    f) recovering a second product stream comprising at least 50% $CO_2$ from the third vapor phase stream of step e).

15. The process of claim 14 wherein the second product stream of step f) comprises from 50 to 99% $CO_2$, from 1 to 30% ethylene, and from 0.5 to 15% propylene.

16. The process of claim 14 further comprising the step of:
    g) recycling at least a portion of the second product stream of step f) to the catalytic fast pyrolysis process from which the first vapor phase stream of step a) results.

* * * * *